March 17, 1931.  C. G. RAIBLE  1,796,665
APPARATUS FOR SETTING CHAPLETS
Filed Nov. 6, 1928   2 Sheets-Sheet 1
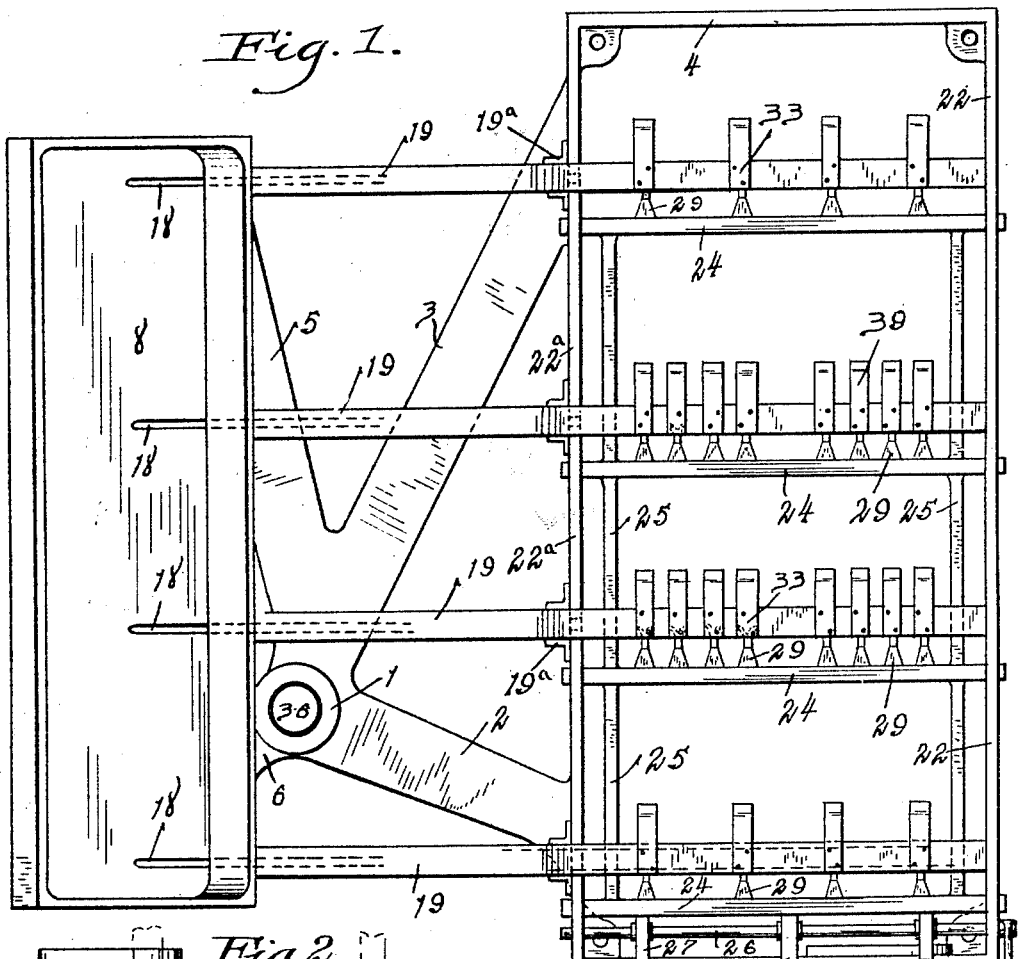
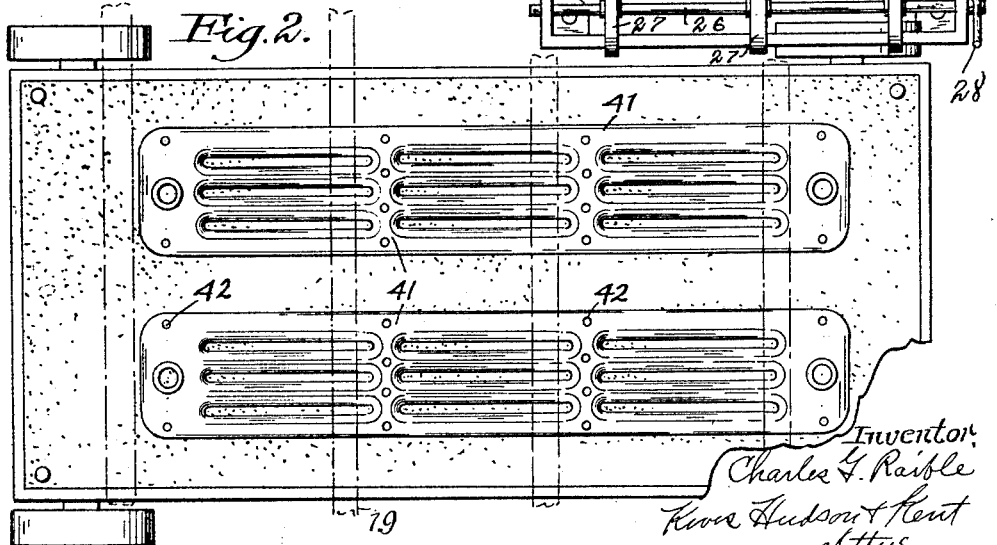

March 17, 1931.  C. G. RAIBLE  1,796,665
APPARATUS FOR SETTING CHAPLETS
Filed Nov. 6, 1928  2 Sheets-Sheet 2
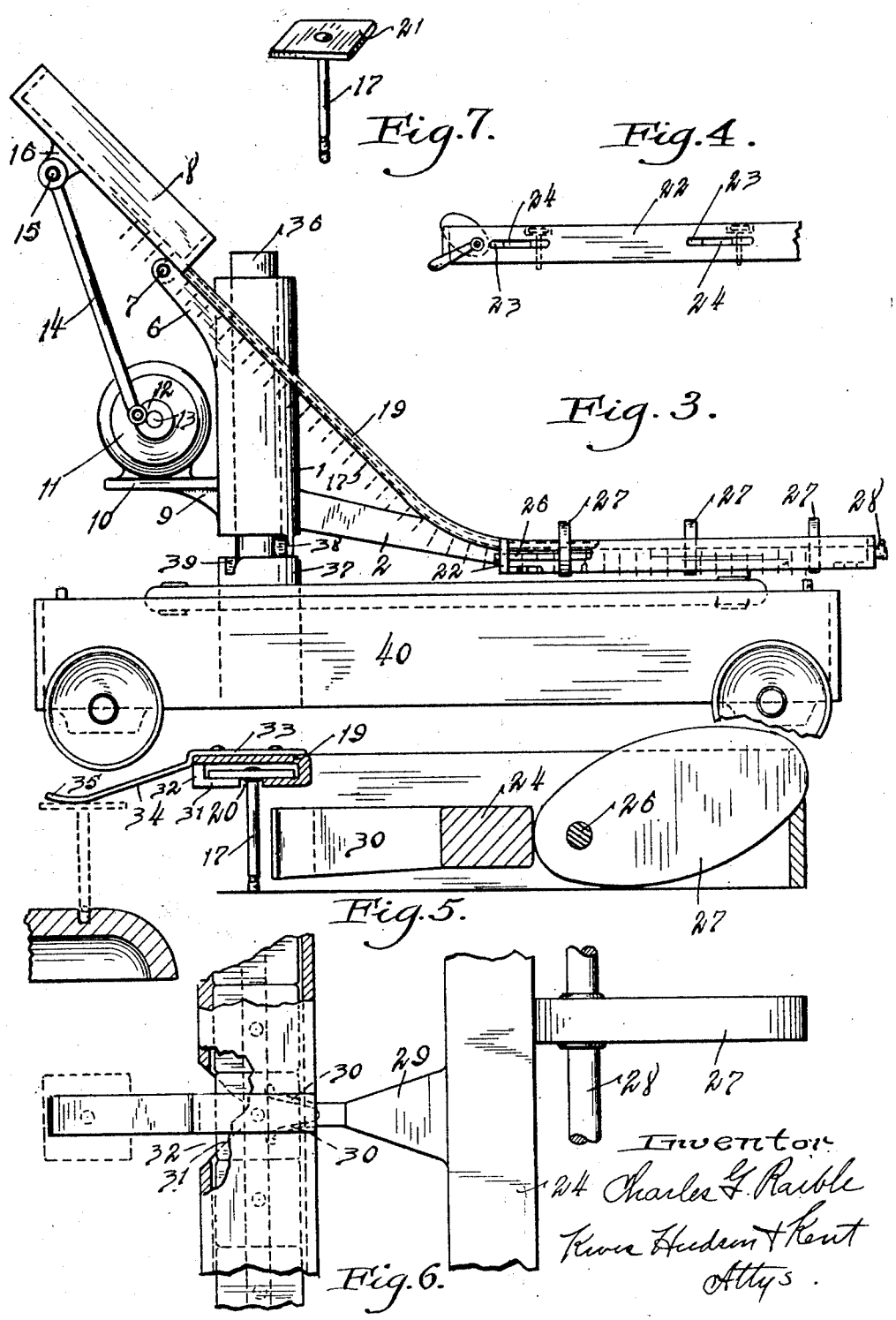

Patented Mar. 17, 1931

1,796,665

UNITED STATES PATENT OFFICE

CHARLES G. RAIBLE, OF CLEVELAND, OHIO, ASSIGNOR OF ONE-HALF TO THE FANNER MANUFACTURING COMPANY, OF CLEVELAND, OHIO, A CORPORATION OF OHIO

APPARATUS FOR SETTING CHAPLETS

Application filed November 6, 1928. Serial No. 317,579.

This invention relates to a method and apparatus for setting or positioning chaplets in a mold for a casting. Heretofore, in the production of certain forms of castings requiring the use of a large number of chaplets to support the core, considerable time and labor have been required for the positioning or setting of these chaplets in the mold since it has always been manually performed and, consequently, the cost of production has been increased proportionately.

An object of the present invention is to provide a method and apparatus for expeditiously and efficiently setting or positioning a number of chaplets in a mold for a casting and to thereby materially reduce the time and cost of production.

Another object is to provide an apparatus for this purpose which is simple in construction, easily operated, and which may be readily altered to adapt it to various molds for different forms of castings.

A more specific object is to provide an apparatus for simultaneously and automatically positioning or setting a plurality of chaplets in the mold for a casting.

Additional objects and advantages will become apparent hereinafter as the description of the invention proceeds.

An embodiment of the invention is illustrated in the accompanying drawings wherein:

Fig. 1 is a top plan view of the chaplet setting or positioning apparatus;

Fig. 2 is a top plan view of a support with a mold arranged thereon;

Fig. 3 is a side elevational view of the apparatus and mold supporting table, certain parts being shown in section to illustrate more clearly certain of the details;

Fig. 4 is a detail side elevational view of a portion of the apparatus;

Fig. 5 is a detail sectional view of a portion thereof;

Fig. 6 is a detail top plan view of a portion of the apparatus, certain parts thereof being shown in section; and Fig. 7 is a detail view of a chaplet.

In describing the embodiment illustrated, the apparatus will be explained as adapted for the setting or positioning of chaplets in molds for radiator section castings, although it should be understood that neither the apparatus nor the method is limited to this particular form of casting since it is equally as useful in connection with any form of casting wherein it is necessary to employ a relatively large number of chaplets to support the core.

In carrying out the invention it is contemplated to initially arrange the chaplets in a frame in rows corresponding in number to the number of rows of chaplets required in the mold and then to position the frame above the mold, after which certain chaplets in each row on the frame will be selectively transferred simultaneously or otherwise from the frame to the mold.

A machine for accomplishing this is clearly illustrated in the plan and elevational views shown in Figs. 1 and 3, respectively, and comprises a cylindrical hub 1 from which extend, adjacent its lower end, a pair of divergent arms 2 and 3 supporting at their outer ends a rectangular frame 4. An arm 5 extending angularly and upwardly away from the arm 3 and an arm 6 extending angularly upwardly from the hub 1 pivotally support as indicated at 7, the forward edge of hopper 8. A bracket arm 9 integrally or otherwise associated with the hub 1, and preferably adjacent its lower end, supports a shelf 10 upon which is arranged a motor or other suitable operating means 11 for causing the hopper 8 to be oscillated about its pivot 7. An eccentric 12 arranged on the motor shaft 13 is connected to the lower end of a link 14, which has its upper end pivotally connected at 15 to a bracket 16 upon the under side of the hopper. It will thus be clear that when the motor 11 is operating the hopper 8 will be continually agitated or oscillated so that the chaplets which it is adapted to contain will also be continually agitated or stirred, with the result that the stems 17 of the chaplets will work through a plurality of slots 18 in the bottom of the hopper, whereby eventually the chaplets will pass into tracks 19 extending therefrom. The tracks 19 are substantially box-like in cross section with the exception that they are each provided with a longitudinal slot 20 in the bottom wall thereof, for the purpose of allowing the stems 17 of the chaplets to pass into such slots which align, respectively, with the slots 18 of the hopper, while the heads 21 of the chaplets will extend across said slots 20 and bear upon the upper side of the bottom walls of the tracks. The tracks are of such size both transversely and vertically that there will be insufficient room for the head of one chaplet to become superimposed upon the head of another chaplet and thereby clog or tie up the movement of the chaplets through the tracks.

The tracks 19 extend downwardly from the hopper and transversely across the rectangular frame 4 so that the upper side of the tracks will be substantially flush with the upper edge of the frame, while the outer end of the tracks may be connected to the far side of the frame. The longitudinal side member 22 of the frame may be a single strip or member but the side member adjacent the hopper is formed of a plurality of separate sections 22a spaced apart beneath the tracks to provide a clearance opening for the stems of the chaplets. The members 22a may be secured to the tracks by angle brackets 19a. Of course any other suitable arrangement may be used to provide this clearance. Adjacent each track but suitably spaced therefrom the longitudinal side members 22 of the frame 4 are provided with a number of horizontal slots 23 corresponding in number to the number of tracks, the slots being arranged in aligned pairs upon the opposite sides of the members 22. These slots are arranged substantially midway of the vertical width of the side members 22 and each pair of aligned slots slidably supports a transversely extending bar 24, these bars being connected intermediate their ends by longitudinally extending bars 25 whereby all of the bars 24 will move in unison. In order to move the bars 24, a shaft 26 is rotatably supported adjacent one end of the frame 4 by the side members 22 thereof, and is provided with a plurality of similar cams 27 adapted to bear against the adjacent cross bar 24 and to cause this bar and the remaining cross bars 24 to move in a given direction a predetermined distance when the shaft 26 is rotated by means of a handle 28 a sufficient distance to utilize the full throw of the cams 27. Each cross bar is provided on the side thereof adjacent to the corresponding track 19 with chaplet engaging members having an attaching portion 29 at the outer end of which is arranged divergent, preferably spring-like fingers 30 for the purpose of permitting the stems 17 of the chaplet to pass into the crotch between the fingers.

Each track 19 at points in alignment with adjacent members 29 is provided with a laterally extending slot 31 in its bottom wall through which a chaplet stem may pass and a slot 32 in its side wall of substantially the width of the chaplet head, whereby a chaplet may be moved laterally of the track with the stem passing through the slot 31 and the head through the slot 32. This movement is imparted to the chaplets by the members 29 as will be more fully explained hereinafter in connection with the operation of the apparatus. A flat spring or equivalent member is secured to the tracks at the points at which they are provided with the slots 31 and 32, such members having an attaching portion 33 adapted to be secured to the upper side of the track and a downwardly extending spring finger portion 34, the outer end of which is curved slightly upwardly as indicated at 35. It should be stated that the number of tracks used in the apparatus is governed by the number of rows of chaplet openings in the mold matrix and, of course, the number of cross bars 24 is governed by the number of tracks, while the number and position of members 29 is governed by the number of chaplet openings in each row of the mold matrix.

From what has already been described it will be clear that when a number of chaplets are placed in the hopper and the latter agitated by means of the motor 11, the chaplets will work downwardly through the tracks 19 with their stems extending through the slot 20 in the tracks in sufficient numbers so that the pressure exerted by the chaplets in the inclined portion of the tracks will cause the preceding chaplets to be carried across and completely fill the horizontal portion of the tracks overlying the frame. When this latter portion of each of the tracks becomes filled with chaplets and the crank or handle 28 is moved to cause the cams 27 to bear against the adjacent cross bar 24, and thus move all of the cross bars toward their adjacent tracks, the fingers 30 of the members 29 will pass over the stems 17 of the chaplets in alignment therewith and will then push said chaplets laterally outwardly from the track through the openings 31 and 32, whereupon the springs 34 will engage with the head 21 of the chaplets and hold the same in engagement with the upper sides of the fingers 30 until the cross bars and the members 29 carried thereby have been advanced the full distance of the throw of the cams 27. However, before this operation of the handle 28 and the movement of the chaplets, as explained, takes place it is necessary to position the frame 4 over the mold. In order that this may be readily accomplished the hub 1, which carries the operative parts as already explained, is rotatably mounted upon an upwardly extending spindle or shaft 36, which is suitably supported in a fixed position, and which is provided with an annular shoulder 37 upon which a lug 38 is adapted to bear and to normally maintain such hub and its associated parts in a relatively elevated position. However, when the hub and its parts have been swung in a certain direction for a certain amount, this lug 38 will coincide with a notch 39 arranged in the annular shoulder 37 and the hub 1 will thus be permitted to slide downwardly on the shaft 36 so that the frame 4 will, in turn, be lowered a corresponding amount. The support 40 for the mold 41 is positioned adjacent to the shaft and after the hopper 8 has been agitated sufficiently to fill the tracks with chaplets the hub 1 and the frame 4 are swung around upon the shaft 36 until it overlies the support for the mold, in which position it is lowered and locked by means of engagement of the lug 38 in the notch 39, whereupon the handle 28 is operated so as to cause the cams 27 to move the cross bars 24 to their full extent in the required direction. During such movement, as already explained, the crotch at the base of the fingers 30, carried by the members 29, engage a chaplet stem and push such chaplet laterally outwardly of the track so that the springs 34 engage upon the heads of the ejected chaplets and hold the same in position between the fingers 30. When the bars 24 have been moved their full limit by the cams 27 and the heads of the chaplet engaged by the spring 34, the chaplets thus ejected from the tracks are in position over the positions 42 in the mold, whereupon when the bars 24 are moved in the opposite direction the springs 34 will retain the chaplets in such position until the fingers 30 have passed from under the heads of the chaplets, after which the chaplets will be free to be pushed by the springs 34 into their respective positions in the mold.

A flask may now be positioned upon the mold support and the sand tamped therein. When the flask has been reversed the heads of the chaplets will be held in the sand while the ends of the stems will extend upwardly therefrom and be in such position that the openings in the core may be positioned thereon. A second flask similarly provided with a sand mold wherein chaplets are arranged in a corresponding manner is positioned upon the first flask and the stems of the chaplets therein engage in openings in the core as did the first group of chaplets. Of course, the part of the operation taking place after the chaplets have been set in the mold is conventional and forms no part of the invention.

It will be seen that the apparatus described provides a simple and efficient means for carrying out a method of setting or positioning a plurality of chaplets simultaneously in a mold cavity and will enable a large saving in production costs to be effected by eliminating the individual manually setting of each chaplet as heretofore practiced.

Although a preferred form of the invention has been shown and described, it should be understood that the same is not to be limited thereto except in so far as the scope of the appended claims so limits it.

Having thus described my invention, I claim:

1. An apparatus for setting or positioning chaplets in a casting mold comprising a frame, means for arranging a plurality of chaplets in each of one or more rows on said frame above and in close proximity to the mold, and means for transferring certain of said chaplets from each row to the mold.

2. An apparatus for setting or positioning chaplets in a casting mold comprising a frame, means for arranging a plurality of chaplets in each of one or more rows on said frame above and in close proximity to the mold, means for positioning said frame above the mold, and means for transferring certain of said chaplets from each row to the mold.

3. An apparatus for setting or positioning chaplets in a casting mold comprising a frame, means for arranging a plurality of chaplets in each of one or more rows on said frame above and in close proximity to the mold, means for positioning said frame over the mold, and means for simultaneously transferring certain of said chaplets from each row to the mold.

4. An apparatus for setting or positioning chaplets in a casting mold comprising a frame, means associated with said frame for arranging a plurality of chaplets in each of one or more rows thereon above and in close proximity to the mold, and means also associated with said frame for transferring certain of said chaplets from each row to the mold.

5. An apparatus for setting or positioning chaplets in a casting mold comprising a frame, means associated with said frame for arranging a plurality of chaplets in a row thereon above and in close proximity to the mold, and means for transferring certain of said chaplets from said row to the mold.

6. An apparatus for setting or positioning chaplets in a casting mold, comprising a frame, a track arranged on said frame and adapted to slidably support a plurality of chaplets, means carried by said frame for ejecting certain of said chaplets from said track, and means associated with said track for guiding the ejected chaplets to their positions in the mold.

7. An apparatus for setting or positioning chaplets in a casting mold comprising a frame, a plurality of tracks associated with said frame and adapted to slidably support a plurality of chaplets, means for positioning said frame and tracks above and in close proximity to the mold, means for simultaneously ejecting certain of said chaplets from each track, and means for guiding the chaplets thus ejected to their positions in the mold.

8. An apparatus for setting or positioning chaplets in a casting mold comprising a frame, a track associated with said frame and adapted to slidably support a plurality of chaplets above and in close proximity to the mold, cam operated means on said frame for ejecting certain of said chaplets from said track, and means for guiding the chaplets thus ejected to their positions in the mold.

9. An apparatus for setting or positioning chaplets in a casting mold comprising a frame, a plurality of tracks associated with said frame and each adapted to slidably support a plurality of chaplets, said frame and said tracks being movable as a unit to position the same over the mold, slidable members supported by said frame adjacent each track and provided with means for ejecting certain of the chaplets from each track, a common means for operating said slidable members, and means associated with said tracks for guiding the chaplets ejected therefrom to their positions in the mold.

10. In an apparatus for setting or positioning chaplets in a casting mold comprising a hopper and a frame rotatable as a unit, means for conveying a plurality of chaplets from said hopper to said frame so as to arrange the same in a plurality of rows thereon, and means for transferring certain of said chaplets from each of said rows to the mold.

In testimony whereof, I hereunto affix my signature.

CHARLES G. RAIBLE.